United States Patent [19]

Moertl et al.

[11] Patent Number: 5,684,986
[45] Date of Patent: Nov. 4, 1997

[54] EMBEDDED DIRECTORY METHOD AND RECORD FOR DIRECT ACCESS STORAGE DEVICE (DASD) DATA COMPRESSION

[75] Inventors: Daniel Frank Moertl; John Douglas Stevens; Gene Steven Van Grinsven; Bruce Marshall Walk, all of Rochester, Minn.

[73] Assignee: International Business Machines Corporation, Armonk, N.Y.

[21] Appl. No.: 472,269

[22] Filed: Jun. 7, 1995

[51] Int. Cl.$^6$ .................................................. G06F 17/30
[52] U.S. Cl. .......................... 395/612; 395/613; 395/614; 395/615
[58] Field of Search ................................ 395/425, 611, 395/612, 613, 614, 615, 650; 364/900, 200; 358/468; 369/53

[56] References Cited

U.S. PATENT DOCUMENTS

| | | | |
|---|---|---|---|
| 4,247,892 | 1/1981 | Lawrence | 364/200 |
| 4,353,653 | 10/1982 | Zimmerman | 400/70 |
| 4,403,288 | 9/1983 | Christian et al. | 364/200 |
| 4,533,995 | 8/1985 | Christian et al. | 364/200 |
| 4,775,969 | 10/1988 | Osterlund | 369/53 |
| 4,797,741 | 1/1989 | Sato et al. | 358/138 |
| 5,031,218 | 7/1991 | Galand et al. | 381/46 |
| 5,034,914 | 7/1991 | Osterlund | 364/900 |
| 5,247,646 | 9/1993 | Osterlund et al. | 395/425 |
| 5,465,167 | 11/1995 | Cooper et al. | 358/468 |
| 5,553,286 | 9/1996 | Lee | 395/650 |

OTHER PUBLICATIONS

Brodie et al. Pat. Appln. S.N. 08/343,316 filed Nov. 22, 1994—Method and Means for Managing Linear Mapped Address Spaces Storing Compressed Data at the Storage Subsystem Control Unit or Device Level.

*Primary Examiner*—Thomas G. Black
*Assistant Examiner*—Frantz Coby
*Attorney, Agent, or Firm*—Joan Pennington

[57] ABSTRACT

An embedded directory record and method are provided for maintaining directory information for compressed data on a direct access storage device (DASD). The embedded directory record includes a plurality of page entries, a plurality of exception region entries and a plurality of compression group statistics. Each page entry includes an allocated page length value and a number of used sectors value in the allocated page. The exception region entries include a page index and a bit map used for identifying exception sectors used. The compression group statistics include a total count of allocated sectors, a total count of the used sectors; and a total count of written pages. A starting page address for a requested page is identified beginning at a start of the page entries by summing the allocated page length values for each page up to the requested page to identify an offset value and combining the offset value with a predetermined logical block address. Reading and writing directory information utilize skip read and skip write operations.

18 Claims, 9 Drawing Sheets

| | DRIVE WRITE COUNT 4-35 | | | | |
|---|---|---|---|---|---|
| HDR0 | | | | | |
| HDR1 | X'1x' | X'00' | X'00' | X'CE' | |
| X'000' | AAAALLLL | AAAALLLL | AAAALLLL | AAAALLLL | ← PAGE ENTRIES 80 |
| X'004' | AAAALLLL | AAAALLLL | AAAALLLL | AAAALLLL | |
| | ... | ... | ... | ... | |
| X'0F8' | AAAALLLL | AAAALLLL | AAAALLLL | AAAALLLL | |
| X'0FC' | AAAALLLL | AAAALLLL | AAAALLLL | AAAALLLL | |
| X'100' | IIII IIII | IIII IIII | IIII IIII | IIII IIII | |
| X'104' | IIII IIII | IIII IIII | IIII IIII | IIII IIII | ← EXCEPTION REGION 82 ENTRIES |
| | ... | ... | ... | ... | |
| X'17C' | IIII IIII | IIII IIII | IIII IIII | IIII IIII | |
| X'180' | EXCEPTION REGION USED BIT MAP BYTES 0-3 | | | | |
| X'184' | EXCEPTION REGION USED BIT MAP BYTES 4-7 | | | | |
| X'188' | EXCEPTON REGION USED BIT MAP BYTES 8-11 | | | | |
| X'18C' | EXCEPTION REGION USED BIT MAP BYTES 12-15 | | | | |
| X'190' | DATA AREA AAAA COUNT | | DATA AREA LLLL COUNT | | ← COMPRESSION GROUP STATISTICS 84 |
| X'194' | HOST PAGE ADDRESS 0-20 | | B'000' | ER L CNT | |
| X'198' | PAGE WRITTEN COUNT | | ssss ssss | FLAGS | |
| X'19C' | cccc cccc | cccc cccc | cccc cccc | cccc cccc | ← CHECK-FIELD 86 |
| X'1A0' | rrrr rrrr | rrrr rrrr | rrrr rrrr | rrrr rrrr | |
| | ... | ... | ... | ... | ← RESERVED/UNUSED |
| X'1FC' | rrrr rrrr | rrrr rrrr | rrrr rrrr | rrrr rrrr | |

MICRO TABLE 44

EMBEDDED DIRECTORY METHOD AND RECORD FOR DIRECT ACCESS STORAGE DEVICE (DASD) DATA COMPRESSION

FIELD OF THE INVENTION

The present invention relates to an embedded directory record and method for maintaining directory information for compressed data on a direct access storage device (DASD).

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture (FBA), the data information tracks are divided into equally sized segments or sectors. Each sector is assigned a number or logical block address (LBA). Typically, a data file is written and read using consecutive LBA's, trackfollowing on the data information tracks of successive consecutive logical data surfaces from the starting LBA. Fragmentation occurs when blocks of data from the file are written to available discontinuous sectors at different locations on the DASD.

To utilize the relatively limited amount of the available data storage capacity of DASDs, data may be stored by a compression technique. However to effectively utilize DASDs, response time should be both predictable and fast. Response time consistency is an extremely important consideration. In cases of heavy work load, response time must at least be predictable. For batch operations, businesses typically rely on certain windows of low system load to run background applications. If time requirements for these applications are not consistent and predictable, it becomes difficult to schedule the work flow, potentially resulting in windows of time where the system is heavily overloaded.

Compressed data blocks vary in size as they are subjected to the cycle of compress, decompress, update, recompress. This requires that an efficient directory mechanism be employed to keep track of the size and location of each compressible data block when stored on DASD.

A need exists for an embedded directory arrangement for efficient management of compressed data on DASD that provides both efficient performance as well as space efficiency.

SUMMARY OF THE INVENTION

Important objects of the present invention are to provide an improved embedded directory record and method for maintaining directory information for compressed data on a direct access storage device (DASD); and to provide such embedded directory record and method that overcome many of the disadvantages of prior art arrangements.

In brief, an embedded directory record and method are provided for maintaining directory information for compressed data on a direct access storage device (DASD). The embedded directory record includes a plurality of page entries, a plurality of exception region entries and a plurality of compression group statistics. Each page entry includes an allocated page length value and a number of used sectors value in the allocated page. The exception region entries include a page index and a bit map used for identifying exception sectors used. The compression group statistics include a total count of allocated sectors, a total count of the used sectors; and a total count of written pages. A starting page address for a requested page is identified beginning at a start of the page entries by summing the allocated page length values for each page up to the requested page to identify an offset value and combining the offset value with a predetermined logical block address. Reading and writing directory information utilize skip read and skip write operations.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
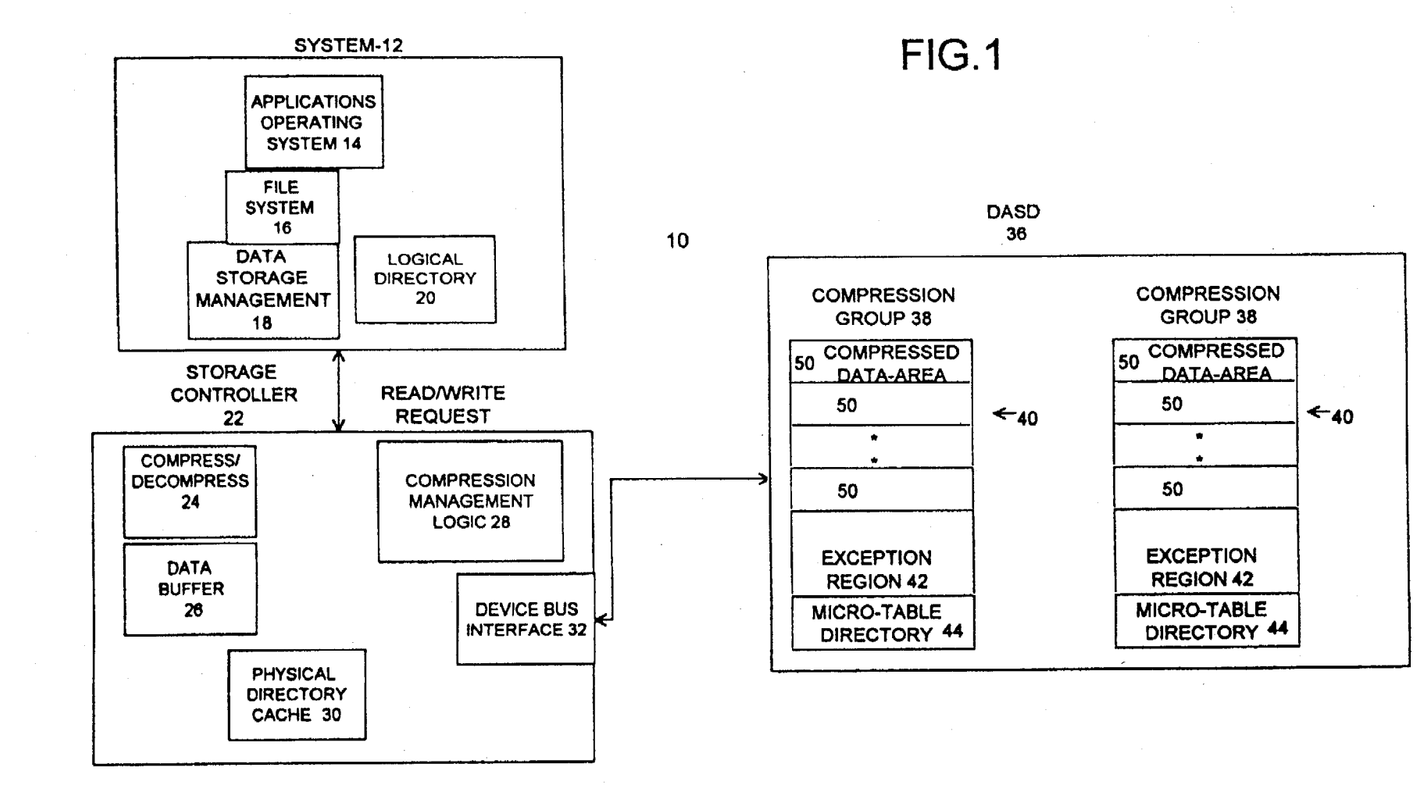
FIG. 1 is a block diagram illustrating a system employing a storage controller for implementing integrated direct access storage device (DASD) compression and a data compression structure in accordance with the present invention.

Referring now to the drawings, in FIG. 1 there is illustrated a block diagram representation of an exemplary system generally designated by 10 for performing a data compression method of the invention. As illustrated, the exemplary system 10 includes a data processing or host system generally designated by 12. Host system 12 includes an application operating system 14, a file system 16 and a direct access storage device (DASD) data storage management function 18 used to store data onto at least one DASD 36. DASD storage management function 18 includes a logical directory 20 that stores the logical block addresses where data is placed on the associated DASD or DASDs 36.

Data is accessed on the DASD 36 through a storage controller generally designated by 22 that compresses data when it is written to the DASD and decompresses data when it is read from the DASD. Storage controller 22 includes a compression and decompression functional block 24, a data buffer 26 for storing data, a compression management logic block 28 for performing address translation and a physical directory cache 30 that is used for storing cached directory elements of the DASD directory generated within the storage controller 22. Storage controller 22 receives data pages from the host system 12, compresses it, and creates compressed data pages to be stored in sectors, appending compression headers that enable directory recovery to occur. Once the physical location of data on DASD is determined by the compression management logic 28, compressed data is passed to or received from the DASD 36 via a device bus interface 32.

DASD 36 includes a plurality of variable sized compression groups 38, each compression group is used for storing related host system data. Each compression group includes a compressed data area 40 for storing original and updated compressed data, an exception region 42 for storing updated compressed pages that are larger than their original allocated space and a directory or micro table 44 for locating data within the compression group. The compressed data area 40 consists of multiple compression regions 50. Compressed data is organized on DASD 36 so that the spatial relationships of related data are maintained within each compression group 38, together with necessary space management parameters. The compressed data arrangement provides consistent performance in a commercial environment and minimizes performance impact due to using data compression.

Figure 1A:
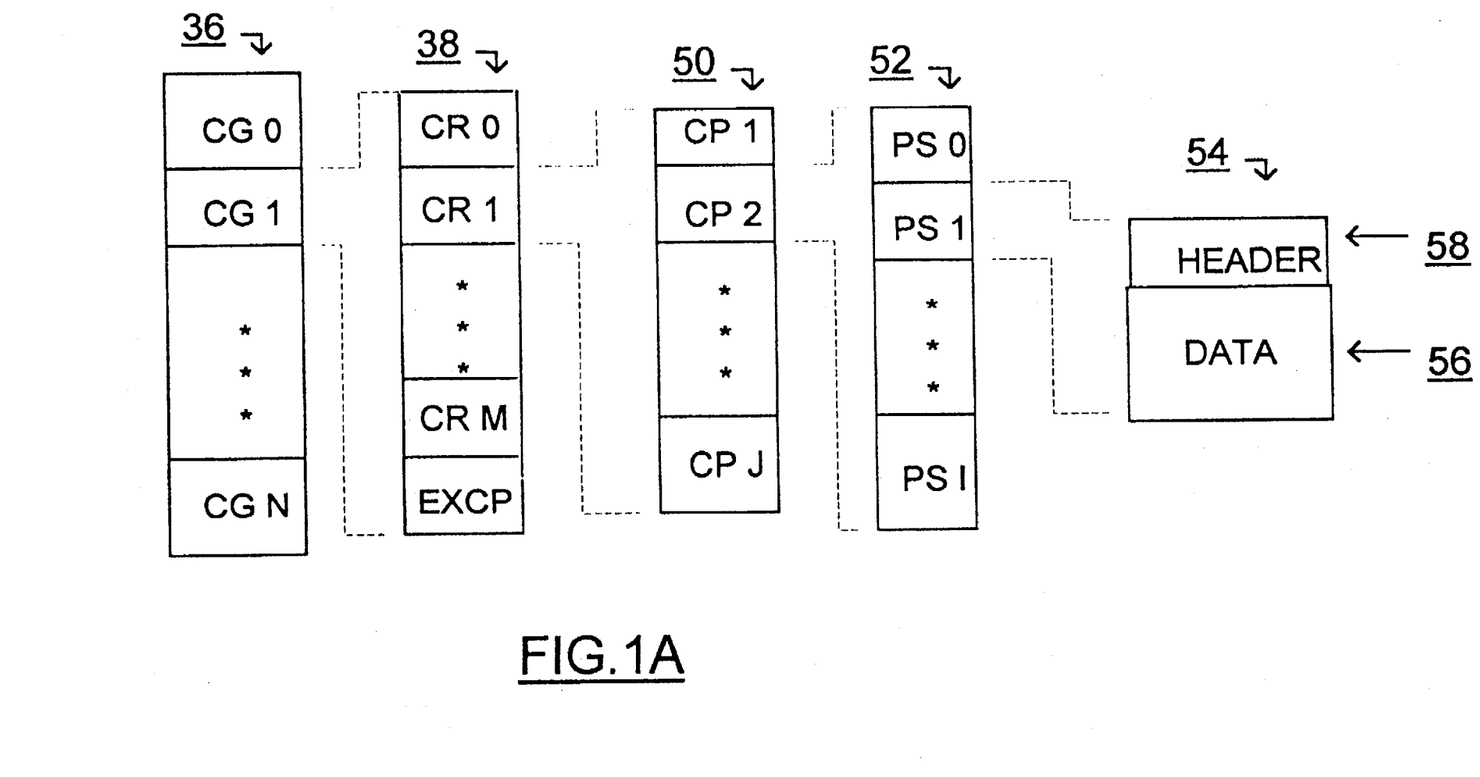
FIG. 1A is a block diagram illustrating a data compression structure in accordance with the present invention.

Having reference now to FIG. 1A, the data compression structure is illustrated. Segmentation of data on DASD is provided into multiple finite blocks or compression groups 38 (CG0 through CG N). Each compression group 38 is managed as an integral unit with space allocated flexibly within it according to a compressed data hierarchy of the invention. Data within each compression group 38 represents a fixed logical address range from the view of host system 12 with variations in physical size depending on the compression characteristics of the stored data. A compression group 38 is not limited to any particular size; however, data storage efficiencies are realized when the compression group size is chosen to be as large or larger than the majority of data blocks that the host system 12 allocates. It should also be relatively large with respect to the system page size. The compression group size is chosen to generally match file system storage management allocation and access patterns. For an IBM AS/400 computer system 12, the compression group size has been selected to be 1 MB with a system page size of 4K. Within the compression group 38, data is stored sequentially in the order dictated by the system addressing model. Each system data page is compressed individually within the group and stored in the physical space equivalent to its compressed size. There is no requirement that compression groups 38 maintain any spatial relationship with respect to one another.

Each compression group 38 consists of a variable number of compression regions 50, and is therefore variable in terms of physical size. As shown, each compression group 38 physically comprises an integral number of compression regions 50 (CR 0 through CR M). Compression regions 50 are used to provide a convenient granularity for managing disk space. Although any size could be used including a sector, the functionally indivisible, minimum addressable data area on DASD 36, selecting the size of the compression region 50 to match the disk geometry, for example, a track size or other implementation dependent size, is beneficial. The use of compression regions 50 is optional, although it contributes to the realization of efficient implementations.

In FIG. 1A, the exception and administration region (EXCP) includes the exception region 42 and the micro table directory 44. EXCP region is predefined space within the compression group 38 for compressed pages that no longer fit in the space currently allocated for them and directory data. The EXCP region consists of an integral number of compression regions 50. Although the EXCP region does affect the sequential storage of data within a compression group 38, exception region 42 ensures that updated data is not stored far from its original storage space and neighboring file data. In many cases, the use of the small computer system interface (SCSI) Skip Read and Skip Write Commands allow for the acquisition of exception region stored data along with its neighboring pages in a single operation. The SCSI Skip Read and Skip Write Commands utilize a skip mask to set selected sectors to be read or written with other sectors set as zero that are skipped. Even when this cannot be accomplished, a long seek is avoided due to the close proximity of the EXCP region. Directory information to aid in the location of data within each block is kept with the data in each compression group 38 in the micro table 44 which is part of the EXCP region 44. Similarly, the close proximity of the directory information to its related data minimizes DASD seeks when the directory must be accessed. Directory information also is cached in the storage controller 22, minimizing updates of directory information in the compression group micro table directory 44.

Each compression region 50 includes multiple compression pages 52 (CP 1 to CP J). The size of the compression page 52 advantageously is selected to be equal to the system page size. This eliminates the need for the DASD subsystem controller 22 to perform read-modify-write operations to a compressed page 52 where only a portion of the data has been modified by the host system 12. The compression region 50 consists of a fixed number of physical sectors 54 containing a variable number of compression pages 52. Physical size of compression page 52 is 1 to n physical sectors 54 (PS 0–PS i) dependent on the particular compression ratio. Compression pages 52 may span compression regions 50 within a compression group 38.

The physical sector 54 includes compressed data 56 and a physical sector header 58 arranged in accordance with the invention for control information used for rebuilding directory information. Initially DASD 36 is formatted to the proper sector size to accommodate compression headers 58 with the sector contents initially zeroed.

A feature of the invention is that each element of the micro table 44 is implemented such that all required information can be maintained within one DASD sector 54, the functionally indivisible, minimum addressable data area on DASD 36. The present invention facilitates indivisible, single sector operation. Directory information is routinely cached in memory of storage controllers. With storage controller 22 managing compression, it is advantageous to avoid the complexity of coordinating multiple sector operations on DASD writes via checkpointing and sequence footprints. Smaller entry sizes logically leads to greater cache efficiency for a given cache size.

Another important feature of the invention is that fast page location resolution is provided. The primary goal of any directory is to locate the information being sought. The time to do this must be short. This should be true for data that remains in the original location where it was placed as well as data that has had to move because of a change in its compressed size.

Data loss or corruption must be prevented. The directory record itself should have a means to detect any corruption of its entries. Sufficient data should be maintained to enable successful recovery from common error conditions as well as enable performance analysis and tuning during operation.

Figure 2:
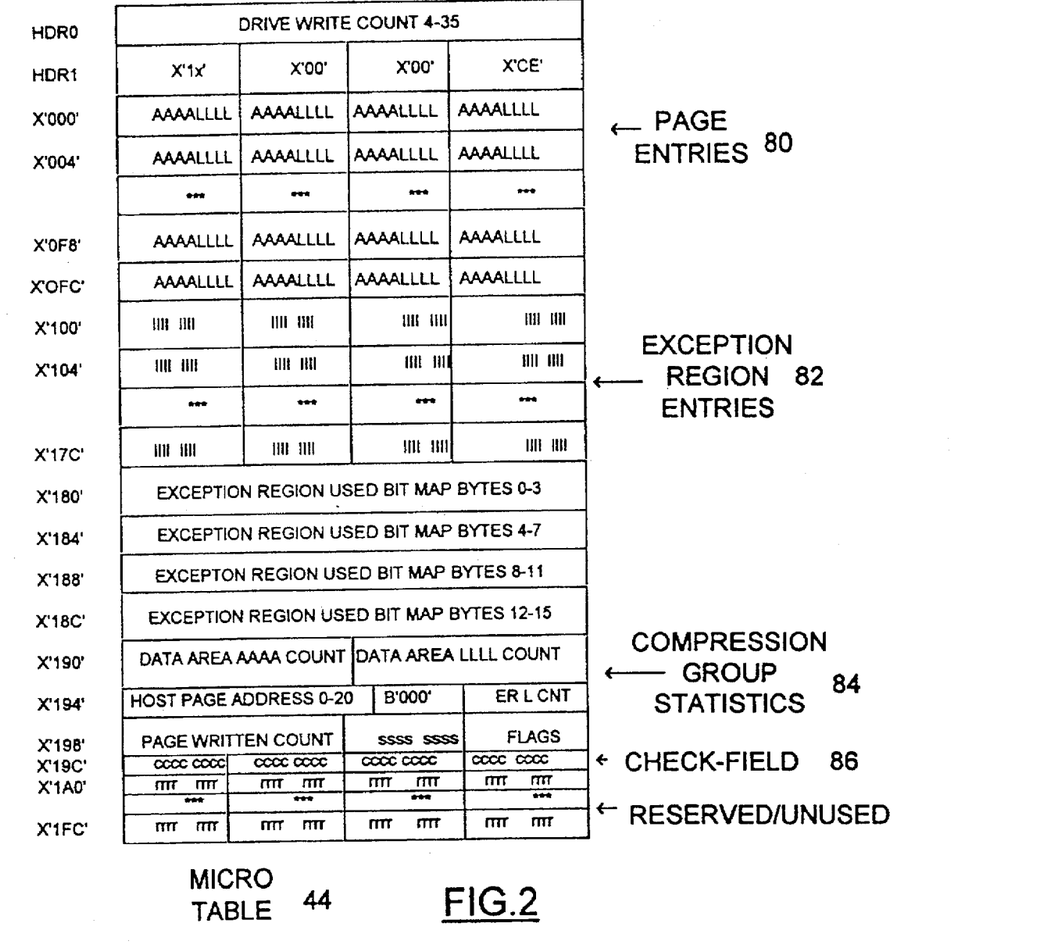
FIG. 2 is a block diagram illustrating a micro table directory of a compression group for the DASD compression system of FIG. 1 in accordance with the present invention.

A format or structure of the micro table 44 is illustrated and described with respect to FIG. 2. As shown, a compression group includes 1 MB with 4K system pages, and 512 byte sectors 54. It should be understood that these sizes can be easily changed and the applicability of the invention remain intact. Similarly, while this format assumes an infrastructure for compression as shown in FIGS. 1 and 1A, the present invention can be used with other data compression arrangements.

Referring to FIG. 2, the micro table 44 consists of page entries 80, exception region entries 82, compression group statistics 84, and a check field 86. The Page entries 80 consist of a one byte entry, AAAALLLL for each page; where, AAAA represents the 'allocated' page length in a number of sectors and LLLL represents the 'used' page length in a number of sectors. Pages are stored sequentially in the data area 50. The compactness of page entry 80 is achieved by eliminating the specific address of the start of a compressed page within the compression group 38 and relying on the relative location of each compression page 52 to one another. Because both the allocated AAAA and actual physical length LLLL of each page is maintained, a detailed accounting is provided of each sector 54 within the data area of compression regions 50 of a compression group 38. In effect, all physical sectors are allocated to some page with each page using only what is required.

The exception region entries 82 consist of a one byte entry, IIII III that represents the compression group page offset (GPO). The GPO entry is a page index relative to the start of the compression group indicating the page that has a sector stored in the exception region 42. In the exception region, sectors 54 for a given page must be stored sequentially but are not required to be contiguous. An exception region used bit map field defines a bit map for each sector 54 in the exception region 42 indicating which sectors are occupied by exception pages.

Reasonably fast and very space efficient exception region management is provided by the exception region entries 82. When placing data into the exception region 42, the exception region used bit map provides a fast mechanism to find which sectors to use in that area. A bit offset into the map can be used to quickly update the compression group page index III III. When reading data from the exception region 42, the compression group page index IIII IIII provides the key to the location of sectors for a page. A simple scan through the entries provides the relative offsets of exception region sectors from the first entry such that a Skip Read operation can be employed to retrieve the exception data. All sectors 54 of the exception region 42 can be effectively used without concern for space fragmentation.

Information provided by the compression group statistics 84 and check field 86 is used for data integrity and tuning statistics. The compression group statistics 82 provide key information that can be employed by the compression management logic 28 in a variety of ways to tune performance and schedule background compression group reorganization operations.

Compression group statistics 84 include a data area AAAA count providing a count of all sectors in the compression group data area 40 that are currently allocated. A data area LLLL count provides a count of all sectors in the Compression Group that are currently used. A host page address 0-20 provides the most significant or high order 21 address bits used to address this compression group 38. An exception region length used count (ER L CNT) indicates the number of sectors in the exception region 42 that are currently being used. A page written count provides a count of the number of pages that have been written in this compression group. Compression group statistics 84 include a flags field for predefined control flags.

Check field 86 provides an error check for all data contained within the micro table 44. Check field 86 is calculated as even parity vertically on a 32 bit word basis over all entries prior to it in the micro table. Check field 86 is provided for error checking of the directory field entries. Data corruption is detected, thus eliminating further customer data loss due to the use of this erroneous information. Reserved/Unused field is not used.

Figure 3:
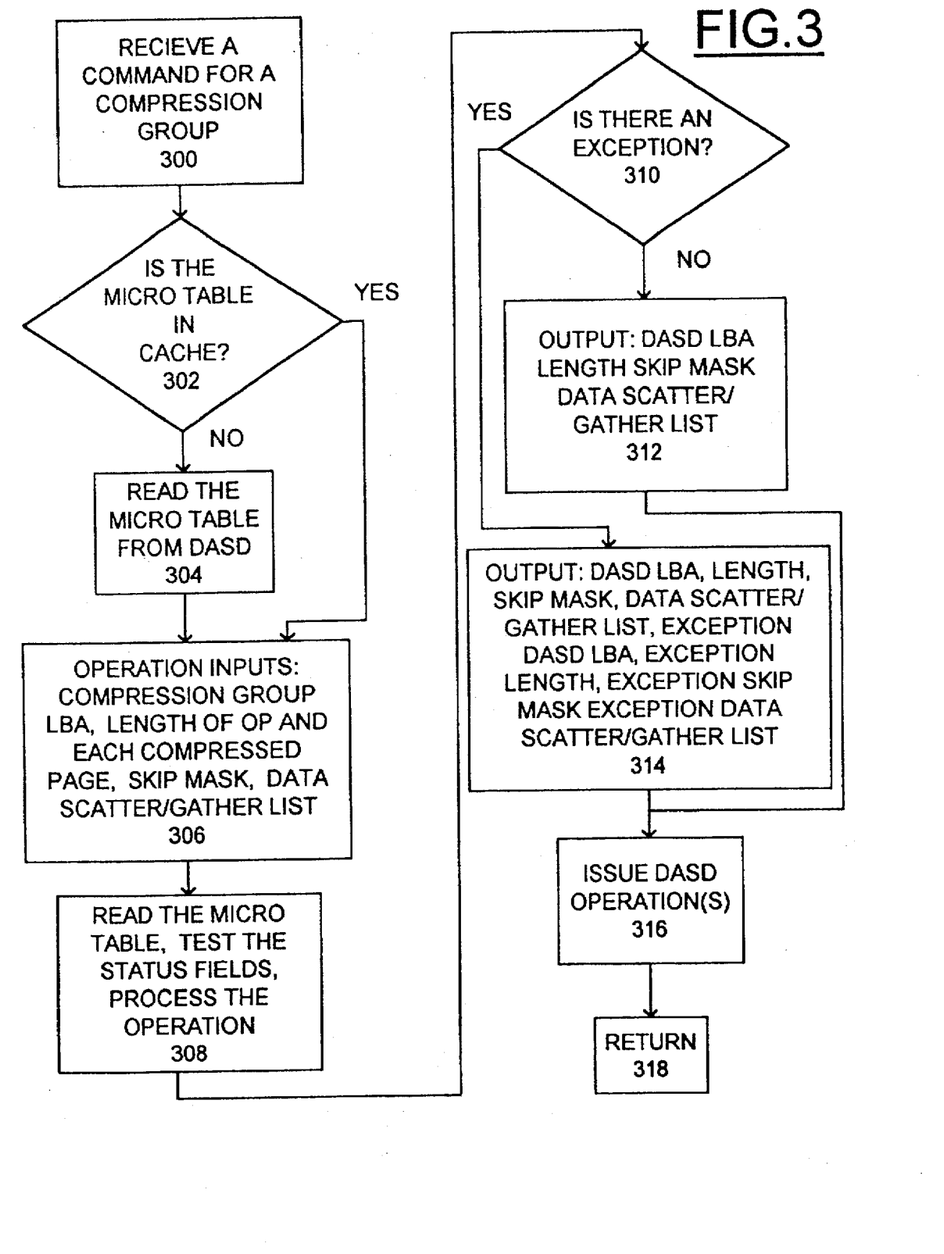
FIGS. 3, 4A, 4B, 5, 6 and 7 are flow charts illustrating logical steps performed by a storage controller of the DASD compression system of FIG. 1 in accordance with the present invention.

Referring now to FIG. 3, there is shown a flow chart illustrating logical steps performed by a storage controller 22 of FIG. 1, using the micro table 44 for reading and writing compressed data on DASD 36 in accordance with the present invention. A feature of the invention is that the starting location of a page is found by the summation of all page entries' AAAA fields for preceding pages. On writes, space analysis requires inspection of the current pages AAAA and/or the adjacent pages AAAA and LLLL fields. Although the summation technique for determining the start of a page is not as time efficient as a directly indexed directory, the space required is far less and performance can be improved through careful code design or custom hardware designs. The operations required to determine whether there is sufficient space available on system page writes becomes simple and efficient.

FIG. 3 illustrates how the micro table 44 is used to locate the requested data and is not intended to highlight all steps in a WRITE or READ. A read or write sequence begins with receiving a command for a particular compression group indicated by the system page index as indicated at a block 300.

It is determined whether the micro table 44 is in the cache 30 of the storage controller 22 by the compression management logic 28 as indicated at a block 302. If not, then the micro table 44 is read from DASD 36 as indicated at a block 304. Otherwise, operation inputs including the compression group LBA, the length of operation and each compressed page, the skip mask, the data scatter/gather list to compression management logic 28 as indicated at a block 306 are acquired. Next the micro table is read, the status fields are tested, and the operation is processed as indicated at a block 308. It is determined whether there is an exception as indicated at a block 310. When there is not an exception, compression management logic 28 outputs include the DASD LBA, length, the skip mask, and the data scatter/gather list as indicated at a block 312. When there is an exception, compression management logic 28 outputs include the DASD LBA, the length, the skip mask, the data scatter/gather list, the exception DASD LBA, the exception length, the exception skip mask, the exception data scatter/gather list as indicated at a block 314. The DASD operation or operations are issued as indicated at a block 316. Then the sequential operations return as indicated at a block 318.

Figure 4A:
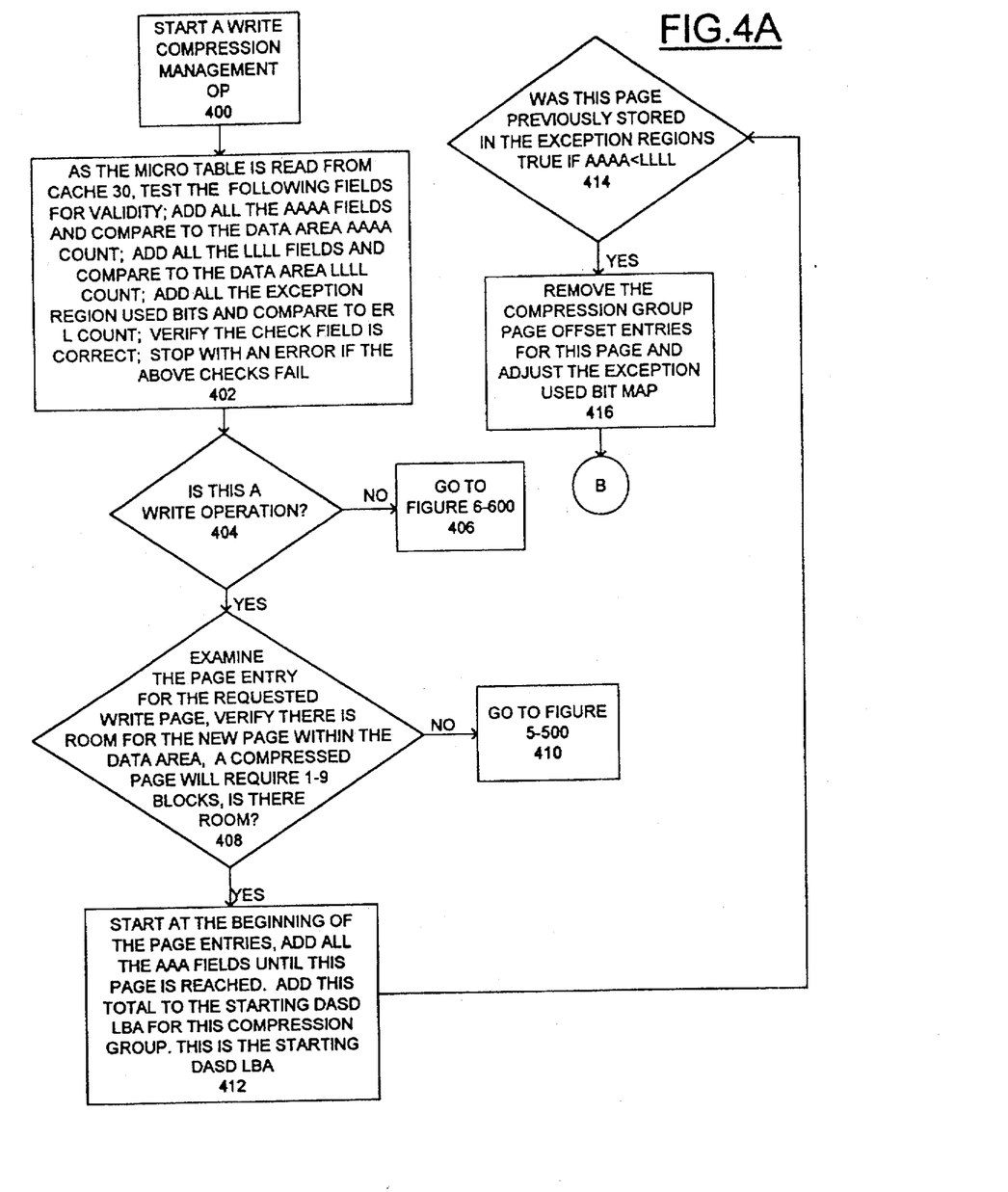

Referring now to FIG. 4A, there is shown a flow chart illustrating logical steps performed by a storage controller 22 of FIG. 1, using the micro table 44 for a one page operation. In FIG. 4A, the single page operation starts with a compression management operation as indicated at a block 400. As the micro table is read from the cache 30, testing for validity is performed on the following fields that includes: add all the AAAA fields and compare to the data area AAAA count; add all the LLLL fields and compare to the data area LLLL count; add all the exception region used bits and compare to the ER L CNT; verify that the check field is correct; and stop with an error if any of the checks fail as indicated at a block 402. This step is optional and is present to ensure a high degree of subsystem reliability.

It is determined if this a write operation as indicated at a block 406. The page entry AAAALLLL 80 for the requested write page is examined to verify there is room for the new page within the data area 50, where a compressed page will require 1-9 blocks, as indicated at a decision block 408. If not, then the sequential steps continue by going to FIG. 5, as indicated at a block 410. Next starting at the beginning of the page entries 80, all the AAAA fields are added until this page is reached. This total is added to the starting DASD LBA for this compression group 38. This is the starting DASD LBA for the write operation as indicated at a block 412. Next it is determined whether this page previously was stored in the exception region 42, where this is true if AAAA is less than LLLL as indicated at a block 414. If so, the compression group page offset entries for this page are removed and the exception used bit map is adjusted as indicated at a block 416.

Figure 4B:
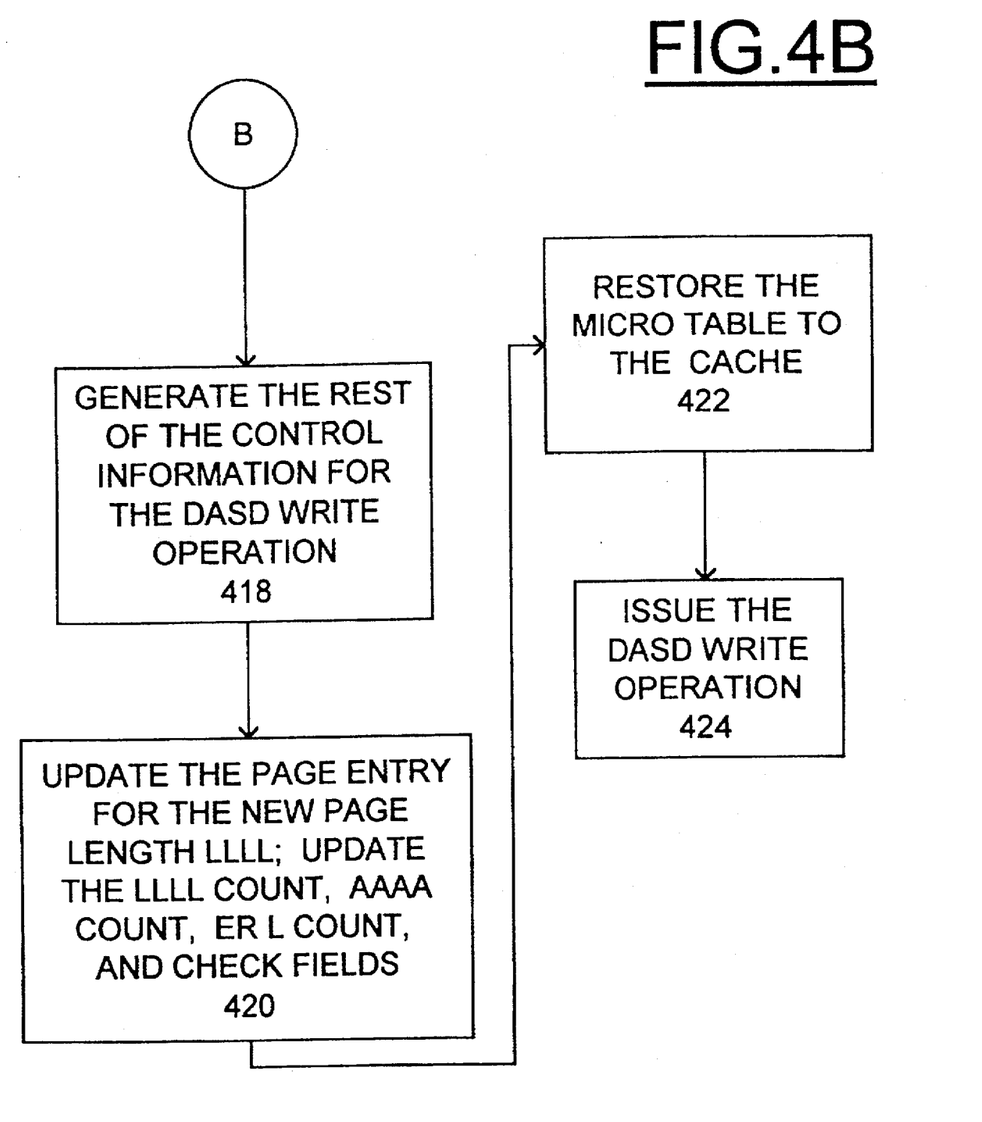

Referring to FIG. 4B, if AAAA is greater than or equal to LLLL, then the additional control information for the DASD write operation is generated as indicated at a block 418. Then updates are provided for the page entry for the new page length LLLL, the LLLL count, the AAAA count, the ER L count and the check fields as indicated at a block 420. Then the micro table is restored to the cache 30 as indicated at a block 422. The DASD write operation is issued as indicated at a block 424.

Figure 5:
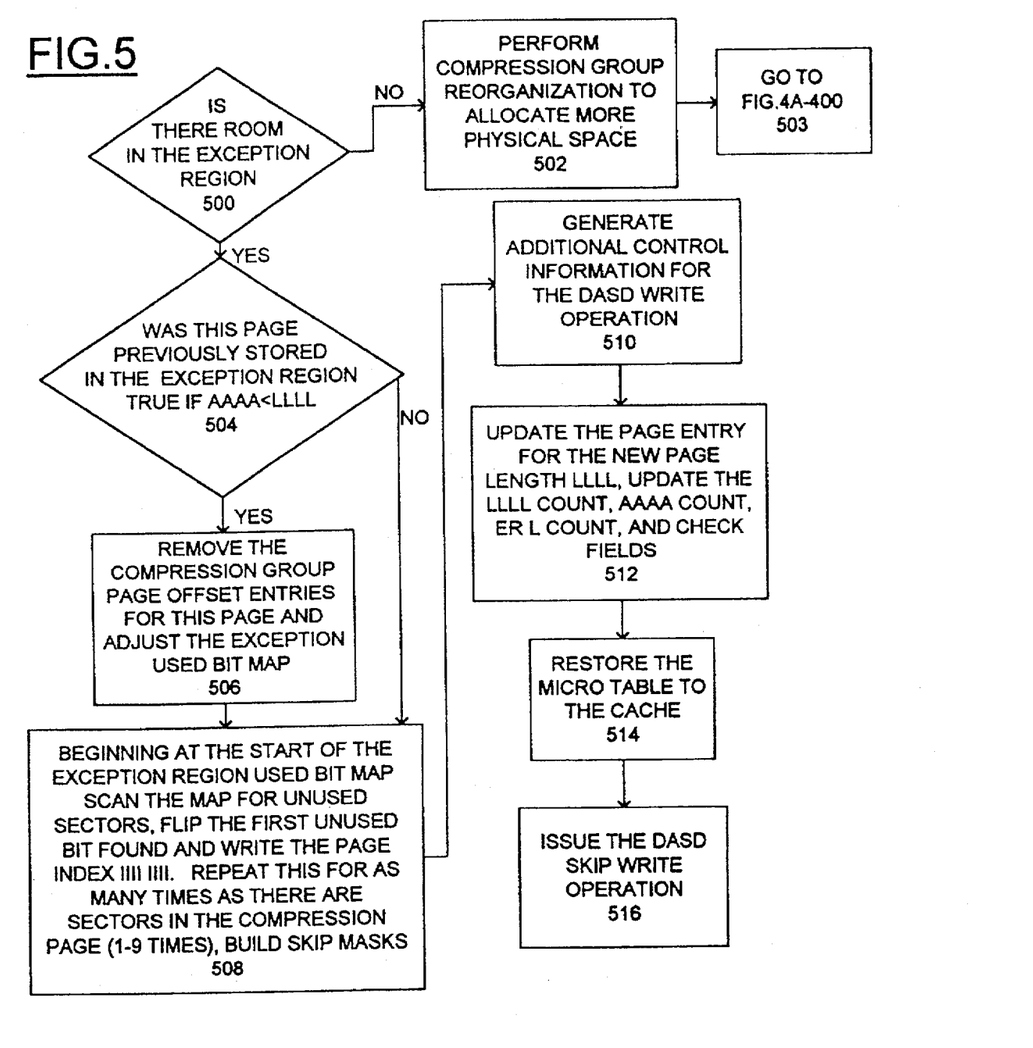

Referring to FIG. 5, when available room in the data area is not identified at block 408 in FIG. 4A, then it is determined if there is room in the exception region as indicated at a block 500. If not, compression group reorganization is performed to allocate more physical space as indicated at a block 502. Once completed, the sequential operations return to block 400 in FIG. 4A. Otherwise if there is room in the exception region, it is determined whether this page was previously stored in the exception region, where this is true if AAAA is less than LLLL as indicated at a block 504. If this page was previously stored in the exception region, the compression group page offset entries for this page are removed and the exception used bit map is adjusted as indicated at a block 506. Otherwise, if this page was not previously stored in the exception region, beginning at the start of the exception region used bit map; then scan the map for unused sectors. Flip the first unused bit found and write the page index into the corresponding exception region page index IIII IIII. Repeat this for as many times as there are sectors in the compression page (1–9 times). Build skip mask as indicated at a block 508. Then the additional control information is generated for the DASD write operation as indicated at a block 510. Next updating is provided for the page entry 80 including the new page length LLLL, the LLLL count, the AAAA count, the ER L count and the check fields as indicated at a block 512. Then the micro table is restored to the cache 30 in storage controller 22 as indicated at a block 514. The DASD skip write operation is issued as indicated at a block 516.

Figure 6:
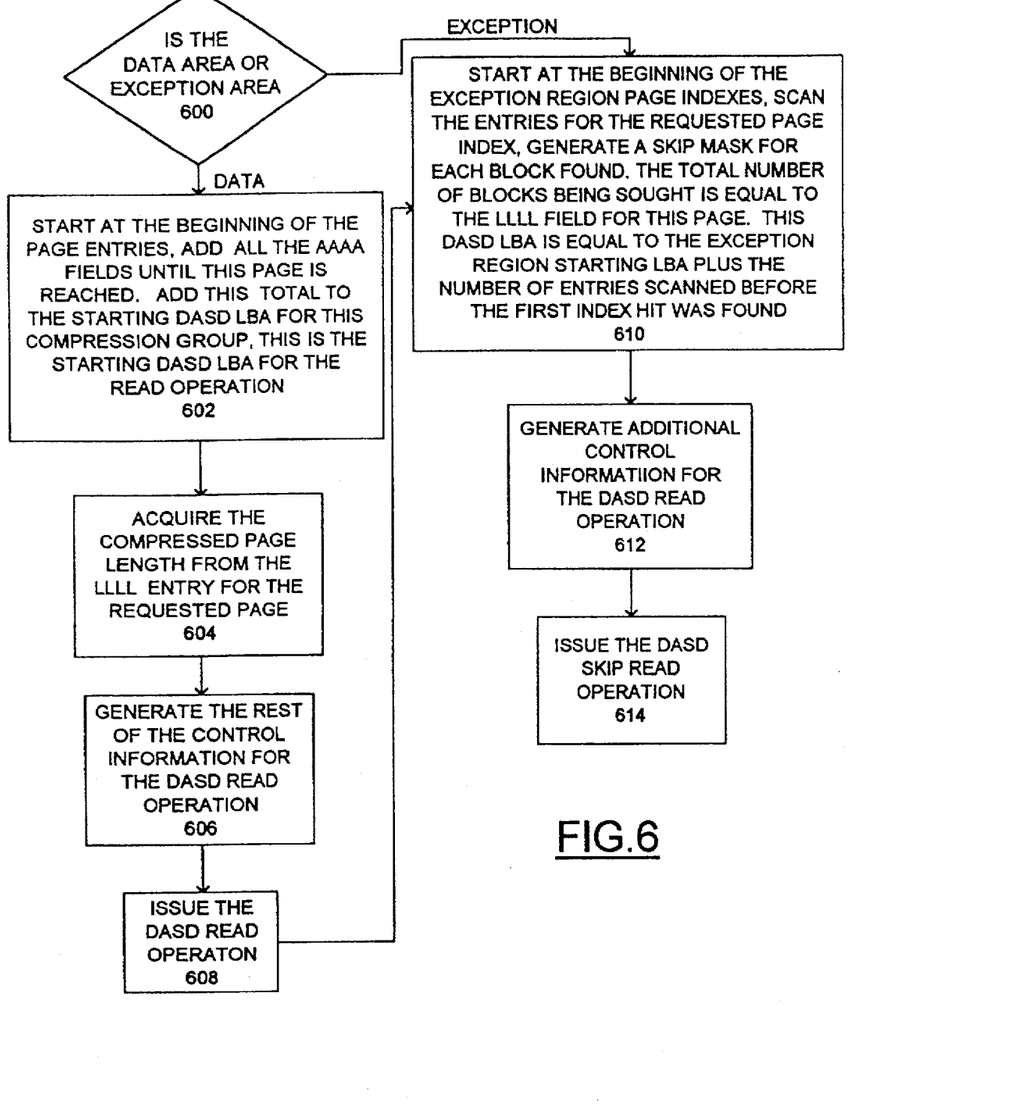

Referring to FIG. 6, when a read operation is identified at block 404 in FIG. 4A, then it is determined if the data is in the data area or exception area as indicated at a block 600. When determined that the data is in the data area, starting at the beginning of the page entries, all the AAAA fields are added until this page is reached. This total is added to the starting DASD LBA for this compression group 38. This is the starting DASD LBA for the read operation as indicated at a block 602. Next the compressed page length is acquired from the LLLL entry for the requested page as indicated at a block 604. The additional control information for the DASD read operation is generated as indicated at a block 606. Then the DASD read operation is issued as indicated at a block 608.

When determined that the data is in the exception area at block 600, starting at the beginning of the exception region page indexes, the entries for the requested page index are scanned and a skip mask for each sector found is generated. The total number of sectors being sought is equal to the LLLL field for this page. This DASD LBA is equal to the exception region starting LBA plus the number of entries scanned before the first index hit was found as indicated at a block 610. The additional control information for the DASD read operation is generated as indicated at a block 612. Then the DASD skip read operation is issued as indicated at a block 614.

Figure 7:
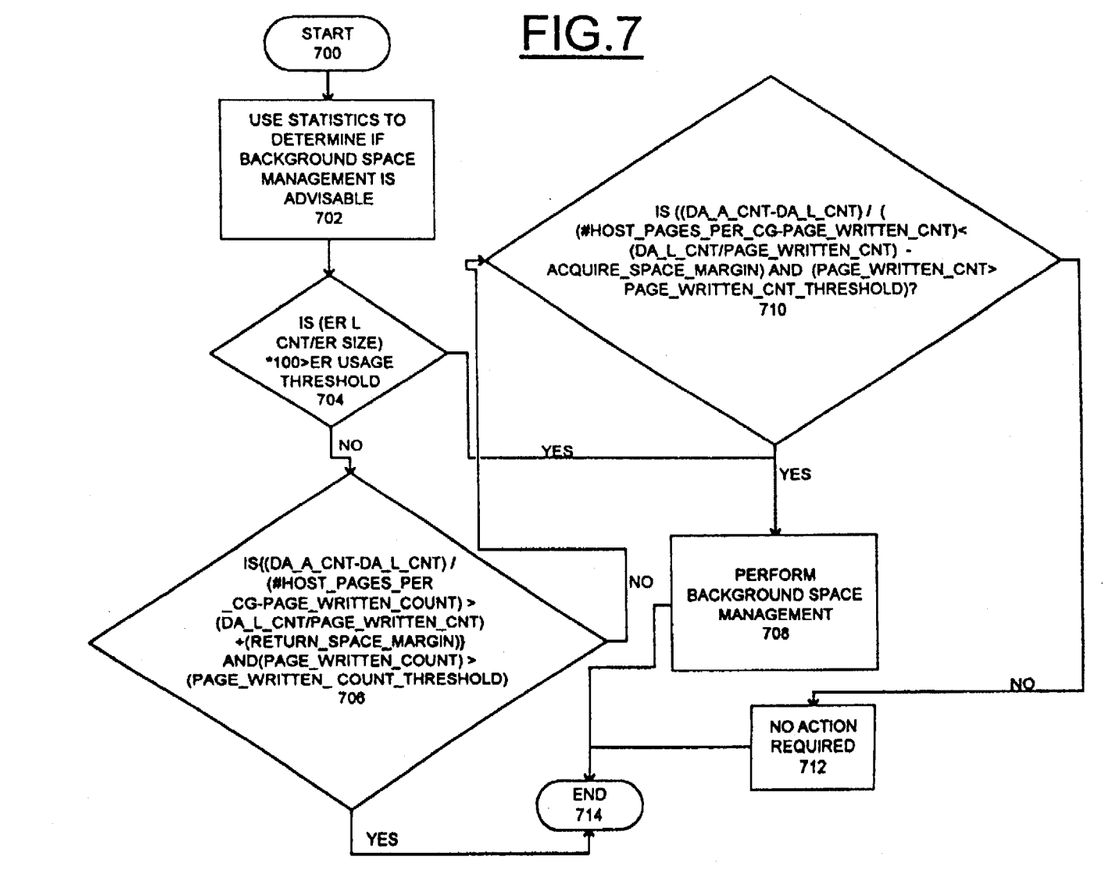

Referring now to FIG. 7, there is shown a flow chart illustrating logical steps performed by compression management logic 28 of the storage controller 22 of FIG. 1, using the micro table 44 for performing background space management for the compressed data on DASD 36 in accordance with the present invention. The sequential steps start at a block 700. Statistics are used to determine when a background space management function is required as indicated at a block 702. First it is determined whether a high number of exception have occurred by dividing the micro table exception region length used count (ER_L_CNT) by the size of the exception region in sectors (ER$_{13}$ SIZE) multiplied by 100 and comparing the result with a predetermined threshold value (ER USAGE THRESHOLD) as indicated at a block 704. When false indicating that a high number of exceptions have not occurred, then a next comparison is performed to detect candidates where physical compression space or compression regions can be freed by performing a background sweep operation at a block 706. When the result is greater than the predetermined threshold value (ER USAGE THRESHOLD) at block 704, then the background space management is performed as indicated at a block 708.

At block 706, storage controller obtains inputs including a data area AAAA count (DA_A_CNT), a data area LLLL count (DA_L_CNT), the total number of pages contained in one compression group (#HOST_PAGES_PER_CG); the page written count from the micro table (PAGE_WRITTEN_COUNT), a first threshold value (RETURN_SPACE_MARGIN), and a second threshold value (PAGE_WRITTEN_COUNT_THRESHOLD). The threshold values are predefined values set by a subsystem designer. Block 706 is labeled IS {(DA_A_CNT-DA_L_CNT)/ (#HOST_PAGES_PER_CG-PAGE_WRITTEN_COUNT)>(DA_L_CNT/PAGE_WRITTEN_COUNT)+ RETURN_SPACE_MARGIN} AND (PAGE_WRITTEN_COUNT>PAGE_WRITTEN_COUNT_THRESHOLD). When true, perform background space management at block 708.

When the result is false at block 706, then a next comparison is performed to detect candidates where physical compression space or compression regions is needed to minimize exceptions at a block 710. The background sweep operation relocates a compression group and eliminates exception region data. At block 710, the data length LLLL count (DA_L_CNT) is subtracted from the data area AAAA count (DA_A_CNT) and the result is divided by the total number of pages contained in one compression group minus the number of pages written (#HOST_PAGES_PER_CG-PAGE_WRITTEN_COUNT) providing a first result. The data length LLLL count (DA_L_CNT) is divided by a page written count (PAGE_WRITTEN_CNT). The result is subtracted from a threshold value (ACQUIRE_SPACE-MARGIN). This result is compared with the first result. A comparison of the page written count (PAGE_WRITTEN_COUNT) is made with a threshold value (PAGE_WRITTEN_CNT_THRESHOLD).

This result also must be true. The threshold values are predefined values set by a subsystem designer. If the result is true at block 710 indicating that physical space is needed to minimize exceptions, then the background space management is performed at block 708. Otherwise, no action is required as indicated at a block 712.

While the present invention has been described with reference to the details of the embodiments of the invention shown in the drawing, these details are not intended to limit the scope of the invention as claimed in the appended claims.

What is claimed is:

1. A directory record for maintaining directory information for compressed data in a compression group on a direct access storage device (DASD), said compression group including addressable sectors for storing data including an exception region on which a plurality of compressed data exceptions can be written, said compressed data exception including updated compressed data which exceeds an original storage space for corresponding original compressed data, said directory record written in said exception region and comprising:

a plurality of page entries including page entry means for identifying an allocated page length value and for identifying a number of used sectors value in the allocated page;

a plurality of exception region entries including exception region entry means for identifying a page index and bit map means for identifying exception sectors used; and a plurality of compression group statistics including means for identifying a total count of allocated sectors, means for identifying a total count of the used sectors; and means for identifying a total count of written pages.

2. A directory record as recited in claim 1 wherein the page entry means include a one-byte entry for each the allocated page, the one-byte entry including the allocated page length value and the number of used sectors.

3. A directory record as recited in claim 1 wherein the exception region entry means for identifying the page index include a one-byte entry for each the page index.

4. A directory record as recited in claim 1 wherein the compression group statistics further include means for identifying identifying a total count of the used sectors in an exception region.

5. A directory record as recited in claim 1 wherein the compression group statistics further include means for identifying a plurality of control flags.

6. A directory record as recited in claim 1 wherein the compression group statistics further include means for identifying and verifying a compression group base address.

7. An embedded directory record as recited in claim 1 further includes a check field means for error checking the directory entries.

8. A method for maintaining directory information for compressed data in a compression group on a direct access storage device (DASD), said directory information including a plurality of page entries, each for identifying allocated page length values and a number of used sectors value in each allocated page; a plurality of exception region entries for an exception region on which a plurality of compressed data exceptions can be written, said compressed data exception including updated compressed data which exceeds an original storage space for corresponding original compressed data, each exception region entry for identifying a page index and a bit map for identifying exception sectors used; and a plurality of compression group statistics including count values for error checking; said method comprising the steps of:

receiving a request for reading or writing a compressed data page from or to the DASD;

identifying predetermined directory information for said requested data page; and testing the predetermined directory information for validity for said requested data page;

identifying an allocated page length for each directory page entry up to said requested data page in a compression group;

summing said allocated page lengths to provide an offset;

identifying a starting logical block address;

summing said identified logical block address (LBA) and said offset to provide a starting LBA for the request.

9. A method for maintaining directory information as recited in claim 8 wherein the step of identifying predetermined directory information and testing the predetermined directory information for validity for said requested data page includes the steps of summing said allocated page length for each directory page entry and comparing the result to a directory data area count; and providing an error check using a directory check field value.

10. A method for maintaining directory information as recited in claim 8 further includes the steps of;

comparing a directory allocated page length value with a directory number of used sectors value; and identifying an exception region data page responsive to an identified directory number of used sectors value greater than an identified directory allocated page length value.

11. A method for maintaining directory information as recited in claim 10 further includes the steps responsive to an identified exception region data page of;

removing said identified offset entries for said requested data page and adjusting an exception used bit map.

12. A method for maintaining directory information as recited in claim 8 further includes the step of updating a directory entry for said requested data page.

13. A method for maintaining directory information as recited in claim 12 wherein the directory information includes page entries contain said allocated page length and a number of used sectors value; step of updating a directory entry includes the steps of updating said allocated page length, updating said number of used sectors value, and updating a check field directory value.

14. A method for maintaining directory information as recited in claim 8 further includes the steps of issuing a skip read command for reading data and directory information from the DASD.

15. A method for maintaining directory information as recited in claim 8 further includes the steps of issuing a skip write command for writing data and directory information to the DASD.

16. A method for maintaining directory information as recited in claim 8 further includes the step of providing a bit map indicating sectors in an exception region.

17. A method for maintaining directory information as recited in claim 16 further includes the step of issuing a skip write command for writing data and directory information to said bit map the DASD.

18. A method for maintaining directory information as recited in claim 16 further includes the step of issuing a skip read command for reading data and directory information from said bit map the DASD.

* * * * *